United States Patent
Fan et al.

(10) Patent No.: US 9,094,589 B2
(45) Date of Patent: Jul. 28, 2015

(54) METHOD AND APPARATUS FOR PROCESSING IMAGE OF PATCH PANEL

(71) Applicant: Xerox Corporation, Norwalk, CT (US)

(72) Inventors: Zhigang Fan, Webster, NY (US);
Hengzhou Ding, Webster, NY (US);
Manavender Malgireddy, Buffalo, NY (US)

(73) Assignee: XEROX CORPORATION, Norwalk, CT (US)

( * ) Notice: Subject to any disclaimer, the term of this patent is extended or adjusted under 35 U.S.C. 154(b) by 308 days.

(21) Appl. No.: 13/866,506

(22) Filed: Apr. 19, 2013

(65) Prior Publication Data

US 2014/0313364 A1    Oct. 23, 2014

(51) Int. Cl.
*G06K 9/00* (2006.01)
*H04N 5/225* (2006.01)

(52) U.S. Cl.
CPC .................................... *H04N 5/225* (2013.01)

(58) Field of Classification Search
CPC ..................................................... H04N 5/225
See application file for complete search history.

(56) References Cited

U.S. PATENT DOCUMENTS

| | | | |
|---|---|---|---|
| 8,605,189 B2 * | 12/2013 | Fan et al. | 348/333.02 |
| 2002/0126169 A1 * | 9/2002 | Wyngaert et al. | 347/12 |
| 2005/0002715 A1 | 1/2005 | Fries et al. | |
| 2012/0189190 A1 | 7/2012 | Bala et al. | |
| 2014/0118560 A1 * | 5/2014 | Bala et al. | 348/207.1 |

OTHER PUBLICATIONS

NineSigma Request for Proposal #67653, "Optical Object Recognition and Feature Mapping by Mobile Devices", 2011, 2 pp.
U.S. Appl. No. 13/461,014, "Product Identification Using Mobile Device", filed May 1, 2012.
U.S. Appl. No. 13/753,790, "Methods and Systems for Detecting an Object Borderline", filed Jan. 30, 2013.

* cited by examiner

*Primary Examiner* — Shefali Goradia
(74) *Attorney, Agent, or Firm* — Fay Sharpe LLP

(57) ABSTRACT

A method for processing an image of a patch panel includes: a) receiving an initial image; b) determining multiple ports of the patch panel are aligned in a desired orientation in the initial image; c) processing the initial image to identify edge lines perpendicular to the desired orientation; d) processing the edge lines to identify a port hypothesis that includes an estimated port gap between the multiple ports along the desired orientation and an estimated port size for the multiple ports along the desired orientation; e) processing the port hypothesis to determine an estimated port quantity for the multiple ports; and f) processing the port hypothesis to identify an estimation error between expected and detected edge line positions in relation to a reference axis perpendicular to the edge lines. An apparatus associated therewith includes an input/output and pre-processing modules and detection, hypothesis, estimating, and scoring processors.

20 Claims, 15 Drawing Sheets

```
Input: port length (P), gap length (G), vertical lines (L), Line class information (Cl)
Output: Score (s)

P -- Current guess of port length
G -- Current guess of gap length
L -- Location of vertical lines
Cl -- 1 :: Start of gap
      2 :: End of a gap // Initialize
s = Inf
// Calculate number of ports
numPorts = L(end) – L(1) / (G+P)

for i = 1 : L(1)+G+P // Vary starting line from first column to first edge + G+P
    score = 0
    currentLine = i // Move port length pixels
    currentLine = currentLine + P
    for j = 1 : numPorts gapStartLine = currentLine // Move gap pixels to right
            gapEndLine = currentLine + G currentLine = currentLine + G

Find line (startLine) closest to gapStartLine and is class 1
            score = score + min(abs(gapStartLine - startLine),P/2)

#Find line (endLine) closest to gapEndLine and is class 2
            score = score + min(abs(gapEndLine - endLine), P/2)
    endfor // Normalize score
    score = score/numPorts;

if(score < s)
            s = score
    endif
endfor return s
```

FIG. 10

METHOD AND APPARATUS FOR PROCESSING IMAGE OF PATCH PANEL

BACKGROUND

The present exemplary embodiment relates generally to processing an image of a patch panel to estimate a quantity of patch panel ports (e.g., connectors, receptacles, etc.) in the image, a gap dimension between the ports, and a port dimension. The exemplary embodiment finds particular application in providing the estimated port quantity, estimated gap dimension, and estimated port dimension in electronic form to a label printer to facilitate printing of a patch panel label with identifying information for the corresponding ports. It also finds particular application in merging the image processing capability with a wireless camera device (e.g., smartphone, tablet, etc.). However, it is to be appreciated that the exemplary embodiments described herein are also amenable to other applications, such as merging the image processing capability with a label printer with or without an embedded camera device.

Patch panels are commonly used in data centers to connect remote clients to servers. Patch panels enable huge data throughput efficiently. The data connections at patch panels can be complex because there can be tens of ports (e.g., RJ-45 connectors) at a single patch panel and tens, or even hundreds of patch panels in a data center. Labeling the ports on the patch panels is usually necessary for installation and maintenance of the patch panel and corresponding data connections.

Labeling the ports on the patch panel requires obtaining the number of ports; sizes of the ports, and inter-port distances. A traditional way to achieve this is to use a measuring tape and manually entering the quantity and measurements for a label printer to generate the labels. While this is not a difficult task, doing hundreds or even thousands of labels this way can be tedious and inefficient.

INCORPORATION BY REFERENCE

The following documents are fully incorporated herein by reference: 1) U.S. Pat. App. Publication No. 2012/0189190 to Bala et al.; 2) U.S. Pat. App. Publication No. 2013/0293734 to Fan et al., Ser. No. 13/461,014, filed May 1, 2012, Product Identification Using Mobile Device; 3) U.S. Pat. App. Publication No. 2014/0211023 to Fan et al., Ser. No. 13/753,790, filed Jan. 30, 2013, Methods and Systems for Detecting an Object Borderline; and 4) RFP 67653 Optical Object Recognition and Feature Mapping by Mobile Devices, NineSigma, Response Due Date Nov. 23, 2011, 2 pages.

BRIEF DESCRIPTION

In one aspect, a method for processing an image of a patch panel is provided. In one embodiment, the method includes: a) receiving an initial image of a patch panel from an image source device at an image processor; b) determining multiple ports of the patch panel are aligned within a predetermined threshold of a desired orientation in the initial image; c) processing the initial image using a detection algorithm to identify edge lines that are perpendicular to the desired orientation; d) processing the edge lines in relation to the initial image using a hypothesis algorithm to identify a first port hypothesis that includes an estimated port gap between the multiple ports along the desired orientation and an estimated port size for the multiple ports along the desired orientation, the estimated port gap based at least in part on a distance between a first pair of adjacent edge lines, the estimated port size based at least in part on a distance between the first edge line pair and another edge line adjacent to the first edge line pair; e) processing the first port hypothesis in relation to the initial image using an estimating algorithm to determine an estimated port quantity for the multiple ports based at least in part on the estimated port gap and the estimated port size; and f) processing the first port hypothesis in relation to the initial image using a scoring algorithm to identify an estimation error between expected and detected edge line positions in relation to a reference axis perpendicular to the edge lines based at least in part on the estimated port quantity, estimated port gap, and estimated port size.

In another aspect, an apparatus for processing an image of a patch panel is provided. In one embodiment, the apparatus includes: an input/output module configured to receive an initial image of a patch panel from an image source device; a pre-processing module configured to determine multiple ports of the patch panel are aligned within a predetermined threshold of a desired orientation in the initial image; a detection processor configured to process the initial image using a detection algorithm to identify edge lines that are perpendicular to the desired orientation; a hypothesis processor configured to process the edge lines in relation to the initial image using a hypothesis algorithm to identify a first port hypothesis that includes an estimated port gap between the multiple ports along the desired orientation and an estimated port size for the multiple ports along the desired orientation, the estimated port gap based at least in part on a distance between a first pair of adjacent edge lines, the estimated port size based at least in part on a distance between the first edge line pair and another edge line adjacent to the first edge line pair; an estimating processor configured to process the first port hypothesis in relation to the initial image using an estimating algorithm to determine an estimated port quantity for the multiple ports based at least in part on the estimated port gap and the estimated port size; and a scoring processor configured to process the first port hypothesis in relation to the initial image using a scoring algorithm to identify an estimation error between expected and detected edge line positions in relation to a reference axis perpendicular to the edge lines based at least in part on the estimated port quantity, estimated port gap, and estimated port size.

In yet another aspect, a non-transitory computer-readable medium storing program instructions that, when executed by a computer, cause a corresponding computer-controlled device to perform a method for processing an image of a patch panel. In one embodiment, the method includes: a) determining multiple ports of a patch panel are aligned within a predetermined threshold of a desired orientation in an initial image; b) processing the initial image using a detection algorithm to identify edge lines that are perpendicular to the desired orientation; c) processing the edge lines in relation to the initial image using a hypothesis algorithm to identify a first port hypothesis that includes an estimated port gap between the multiple ports along the desired orientation and an estimated port size for the multiple ports along the desired orientation, the estimated port gap based at least in part on a distance between a first pair of adjacent edge lines, the estimated port size based at least in part on a distance between the first edge line pair and another edge line adjacent to the first edge line pair; d) processing the first port hypothesis in relation to the initial image using an estimating algorithm to determine an estimated port quantity for the multiple ports based at least in part on the estimated port gap and the estimated port size; and e) processing the first port hypothesis in relation to the initial image using a scoring algorithm to identify an estimation error between expected and detected edge line positions in relation to a reference axis perpendicular to the edge lines based at least in part on the estimated port quantity, estimated port gap, and estimated port size.

BRIEF DESCRIPTION OF THE DRAWINGS

FIG. 10 is a listing of a portion of pseudo code associated with processing an image of a patch panel to estimate a port quantity, gap dimension, and port dimension;

DETAILED DESCRIPTION

This disclosure describes various embodiments of methods and configurations of an electronic device with an image processor for processing an image of a patch panel to estimate a quantity of patch panel ports (e.g., connectors, receptacles, etc.) in the image, a gap dimension between the ports, and a port dimension. The estimated port quantity, estimated gap dimension, and estimated port dimension can be provided to a label printer in electronic form to facilitate printing of a patch panel label with identifying information for the corresponding ports. The image processing capability can be implemented in any electronic device. For example, the image processing capability can be embedded in a wireless camera device (e.g., smartphone, tablet, etc.). The image processing capability can also be embedded within a label printer with or without an embedded camera device.

In one embodiment, the method estimates the size of ports (port length), inter-port distance (gap length) and number of ports from an image captured using a mobile phone. A set of markers may be provided in a user interface for the mobile phone to assist the user in better localization of ports and to avoid confusion in cases of multiple groups of ports. A region of interest can be extracted from the image based on the marker locations. This image is then fed into edge detection algorithm to extract vertical edges. A horizontal profile of the edge map can be used to extract vertical lines in the image. Various image processing techniques are used to estimate port length, gap length and number of ports. For example, a search based error minimization algorithm can be used to choose a hypothesis for the estimates from multiple hypotheses using a scoring approach to determine minimum error for the estimates.

Patch panels are used in data centers to connect servers and remote clients. Due to the complexity of these data connections, there can be tens of connectors (e.g., RJ-45) originating from a single patch panel, with tens, or even hundreds of such panels in a data center. The complexity of these data centers requires labeling of individual ports on these panels to facilitate installation and maintenance.

Typically, ports on a patch panel are divided into groups. Within each group, there may be different numbers of ports (e.g., 4, 6, 8, etc.). To generate a label, one usually prints a single strip for a port group with dividers to separate different ports. Therefore, in order to correctly print out the label, both the dimensions of the ports and inter-port distances have to be measured accurately.

Figure 1:
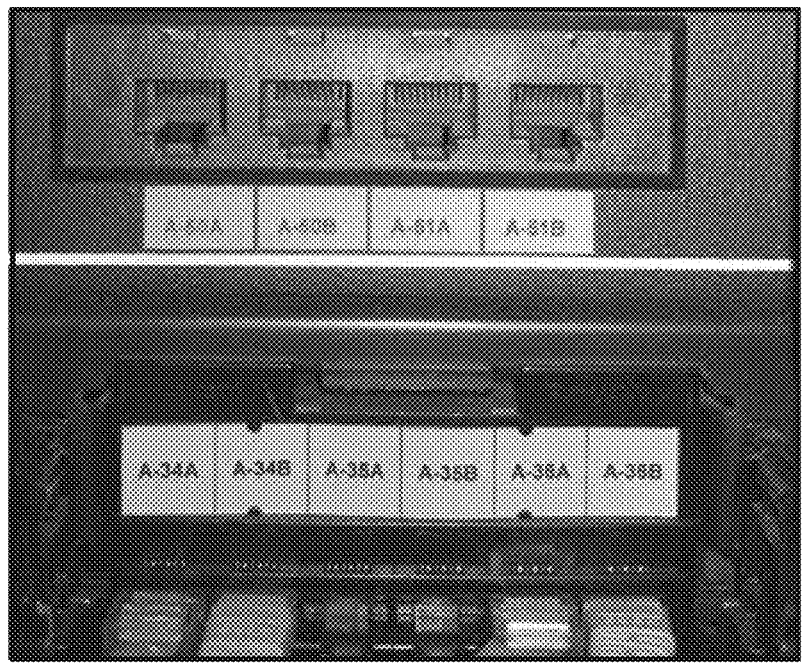
FIG. 1 is a view of a portion of an exemplary embodiment of a patch panel.
Figure 2:
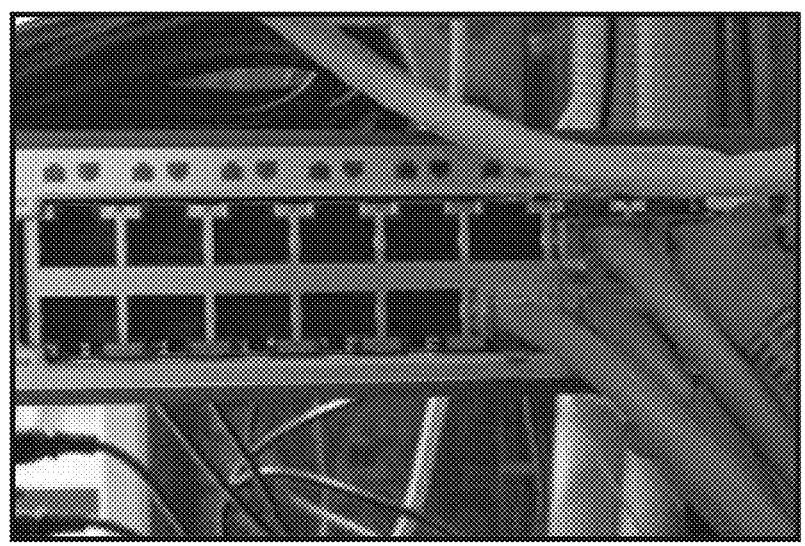
FIG. 2 is a view of a portion of another exemplary embodiment of a patch panel.

With reference to FIG. 1, an example of patch panel includes a 4-port group on the top and a 6-port group on the bottom. Notably, the inter-port distances for the port group on the top and the port group on the bottom are different. The resulting label strips, which are also present in FIG. 1, look different in terms of unit port length. In FIG. 2, two groups of eight ports are shown.

A traditional way to obtain measurements for patch panel labels is to use a measuring tape and subsequently input the measurements into a label printer to generate the labels. While this is not a difficult task, doing hundreds or even thousands of these labels in this way can be tedious and inefficient. An alternative approach is to utilize a camera-equipped electronic device, such as a smartphone, to take an image of the to-be-labeled ports and automatically estimate the dimensions of the ports. See FIGS. 1 and 2 for examples of images of patch panels. These estimated measurements from the image can be sent to the label printer without manual input.

Estimating dimensions from an image of the ports requires segmenting and analyzing the image. Challenges involved in this process vary from localizing the ports, handling perspective/rotation distortion, lighting conditions to images of ports covered with wires. For example, in FIG. 1, it is unclear which group of ports the user is aiming at. On the other hand, FIG. 2 illustrates a scenario where there are background clutters. In particular, several ports on the right of the group are occupied with Ethernet cables. As a result, it is difficult to accurately determine the number of ports as well as the boundary of the group.

The various embodiments of methods and electronic devices for processing an image of a patch panel Invention described herein automate the process of printing labels for patch panel images by estimating the required dimension using image processing algorithms.

Figure 3:
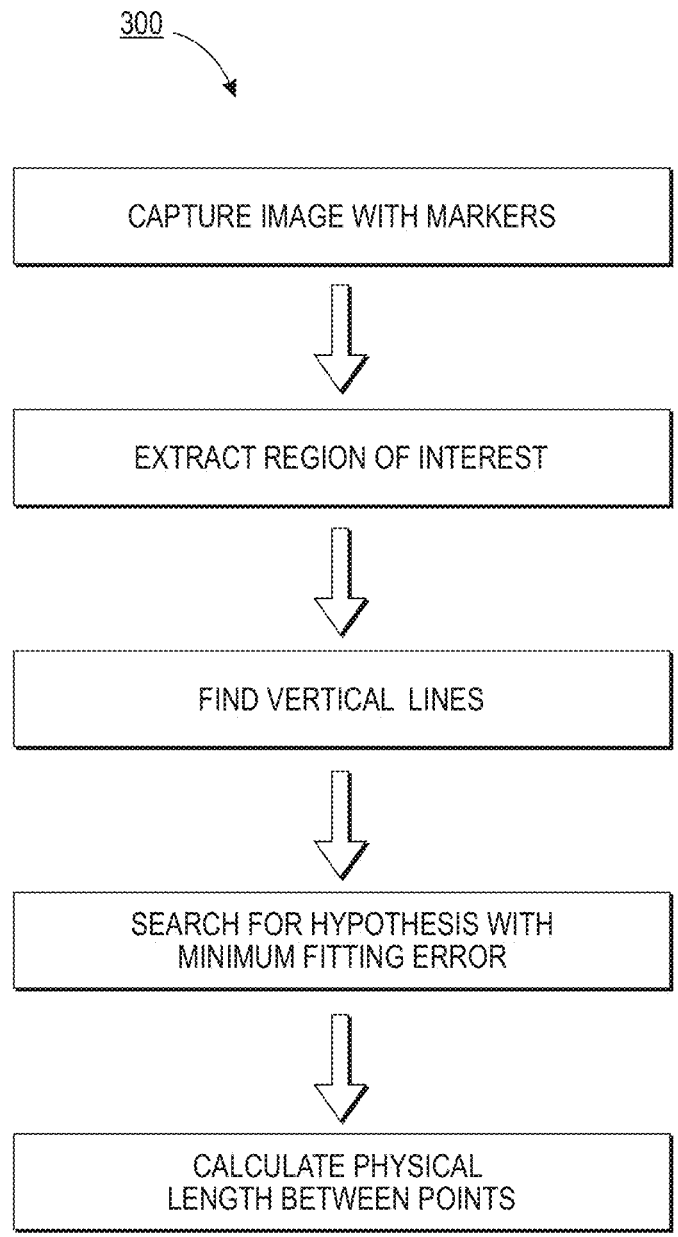
FIG. 3 is a flowchart of an exemplary embodiment of a process for processing an image of a patch panel.
Figure 4:
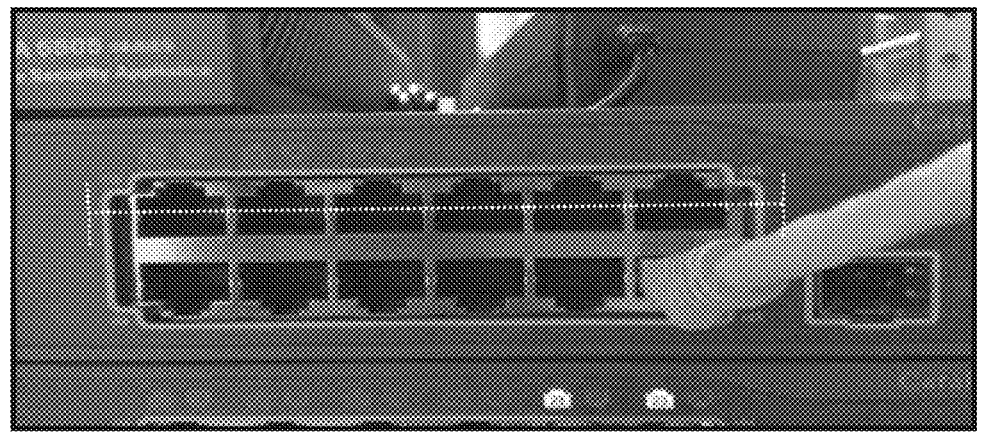
FIG. 4 is a screen view with an exemplary marker on a preview screen of a camera device prepared to capture an image of a patch panel.
Figure 5:
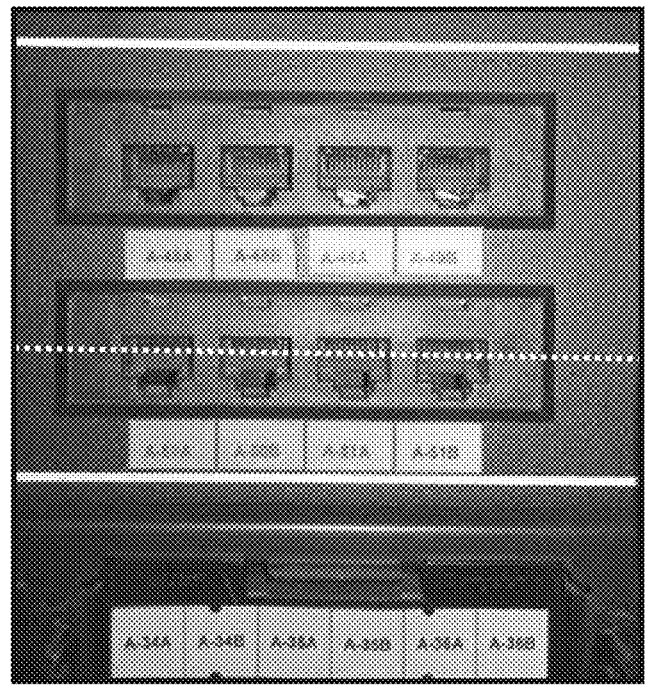
FIG. 5 is a screen view with another exemplary marker on a preview screen of a camera device prepared to capture an image of a patch panel.
Figure 6:
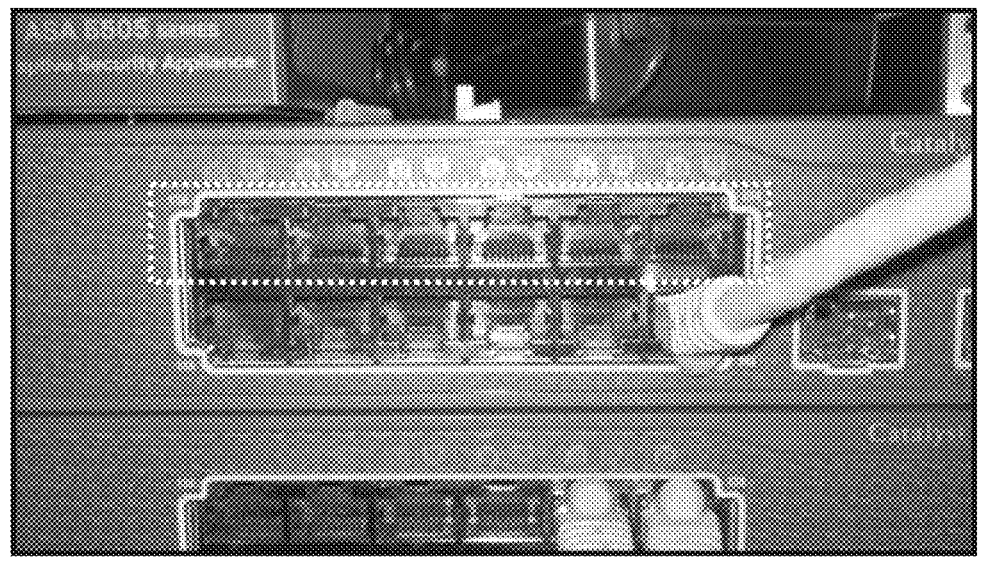
FIG. 6 is a screen view with yet another exemplary marker on a preview screen of a camera device prepared to capture an image of a patch panel.

With reference to FIG. 3, an exemplary embodiment for processing an image of a patch panel shows the overview of the process 300. Markers are provided in the user interface to allow users to make some alignment during the capture process. To some extent, this reduces the distortion due to perspective and rotation. Various types of markers can be used to guide the user to capture a group of ports. For example, the marker can be overlaid on a preview frame of the camera. FIGS. 4-6 show several examples of markers in which the port group to be captured is horizontal. It is understood that the markers can be easily extended to vertical port groups or port groups with arbitrary orientation or rotation.

With reference to FIG. 4, a marker scenario is shown with a horizontal straight line segment with starting and ending points depicted by two short vertical lines. In this case, the user is interested in the 6-port group on the top shown at the center of the image. The starting and ending points in this marker are particularly useful if, immediately adjacent to the port group of interest, additional ports belonging to a different group are also present. Without the starting and ending points in the marker, there might be confusion in determining the number of ports, as the adjacent group is geographically close to the group of interest. Hence, for certain scenarios, it is beneficial to introduce the starting and an ending mark along with the straight line marker to limit the range for which the analysis will be carried out. The starting and ending points can be fixed relative to the view finder frame. The user will be instructed to align them with the port group by moving the camera and/or adjusting the zoom factor. Alternatively, the UI can ask the user to tap on the screen to indicate starting and ending points.

With reference to FIG. 5, a horizontal straight line marker is shown in the center of the view finder. The user is then instructed to align the line with the port group that he/she intends to measure. In this case, although the final image has three different port groups present, there is no confusion about which group is to be analyzed because of the straight line marker. Also, the post-processing will be faster and more robust, because now there is no need to analyze the entire image and search for candidate port groups. The analysis can be simply carried out at the center region associated with the straight line marker.

With reference to FIG. 6, a rectangular box can be shown in the view finder so the user can similarly align the box with the port group when he/she is capturing the image. Alternatively, the size and aspect ratio of the rectangular box can be editable via the touch screen so as to better fit the geometric characteristic of the port group.

Figure 7:
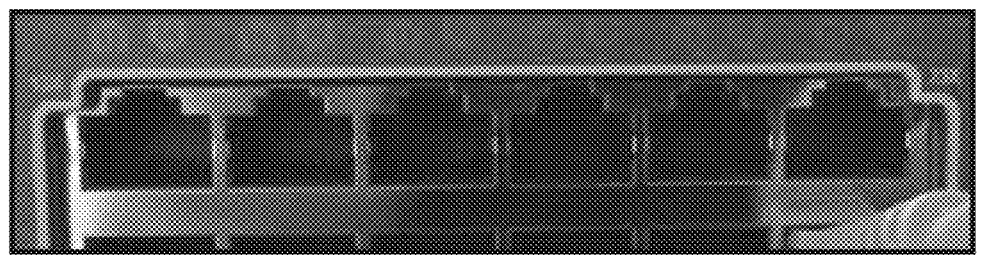
FIG. 7 is an exemplary region of interest extracted from a patch panel image captured by the camera device in relation to the screen view of FIG. 4.

Extracting a region of interest from the patch panel image can be accomplished with the help of the markers. The height of the region of interest may a quarter of the width. FIG. 4 shows an example image of a patch panel with markers overlaid on the image. FIG. 7 shows an example of the region of interest extracted from the patch panel image of FIG. 4.

Figure 8:
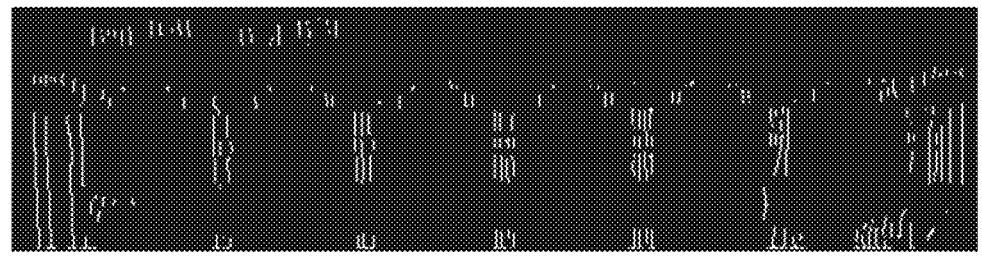
FIG. 8 is an exemplary edge map showing vertical edges from edge detection processing of the region of interest of FIG. 7.
Figure 9:
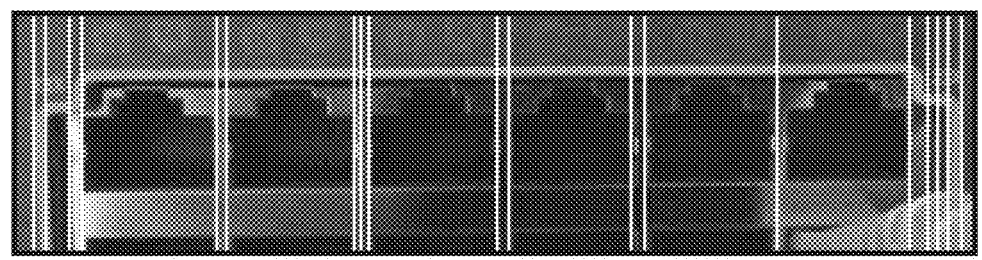
FIG. 9 is an exemplary image showing vertical lines overlaid on the region of interest of FIG. 7.

The extracted region of interest from the patch panel image is converted to grayscale. Vertical edges are extracted using an edge detector, such as the well-known Canny edge detector, to create an edge map. FIG. 8 shows an example of vertical edges in an edge map. From this edge map, a horizontal profile is calculated. Columns with a value greater than a predetermined threshold (e.g., 0.3 times a maximum value for the image were used in experiments) are considered a vertical line. This might result in many lines which not necessarily associated with edges of the patch panel ports (for example, because of blurriness in the edges). Consecutive lines may be combined to get a final set of vertical lines. FIG. 9 shows a patch panel image with the vertical lines overlaid.

A hypothesis search begins with a hypothesis of gap length by choosing the first vertical line as the start line of the gap and the second vertical line as its end line. Other pairs of lines with similar gap lengths (candidate gap lines) are identified. Then, port lengths are calculated as distance between first candidate gap line and next five candidate gap lines. This gives a set of five hypotheses (or less if there are less number of candidate gap lines). By keeping the start line same and varying only end line, a set of hypotheses can be identified. This can be repeated by varying the start line from first vertical line to the last vertical line. For each hypothesis, a score can be calculated. The hypothesis with the minimum score is the returned as the identify the estimated measurements with the best fit.

In order to find the best hypothesis, the image processing technique includes a scoring function that gives a best score when the hypothesis is correct and/or close to correct (e.g., best fit). First, the vertical lines can be classified into two classes based on the transition from dark to bright pixels (e.g., start of a gap) or vice-versa (e.g., end of a gap). The basis assumption behind this classification is that the port is darker than the gap between the ports. This assumption can be referred to as the dark ports assumption. A starting point in the image is chosen for the scoring algorithm and then moved port length pixels to calculate the error by measuring the distance between the resulting estimated position for the start of the next gap and the nearest line with corresponding class label. Next, the scoring algorithm moves gap length pixels and calculates the error in the same manner. This is repeat for the given number of ports and the score is calculated as the mean score across all ports for the corresponding hypothesis. This procedure is repeated by varying the starting line. The score with the minimum value is returned. FIG. 10 shows an example of pseudo code that can accomplish the scoring function used for this problem.

Figure 11:
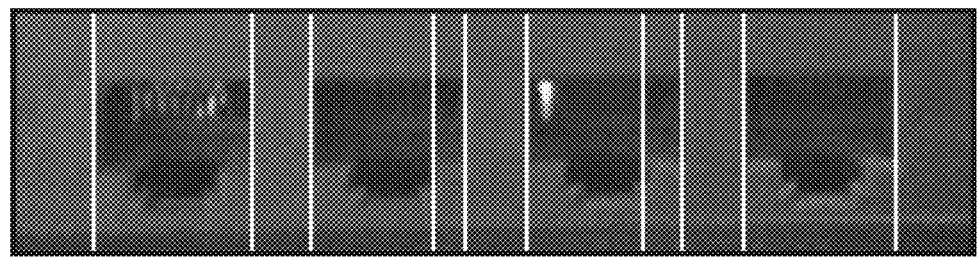
FIG. 11 is an exemplary image showing certain vertical lines overlaid on an image of a patch panel with four ports.

FIG. 11 shows vertical lines and corresponding class information for the scoring function. Lines 1, 3, 6, and 9 are classified as lines associated with the start of a gap between ports. Lines 2, 4, 5, 7, 8, and 10 are classified as lines associated with the end of a gap between ports.

Figure 12:
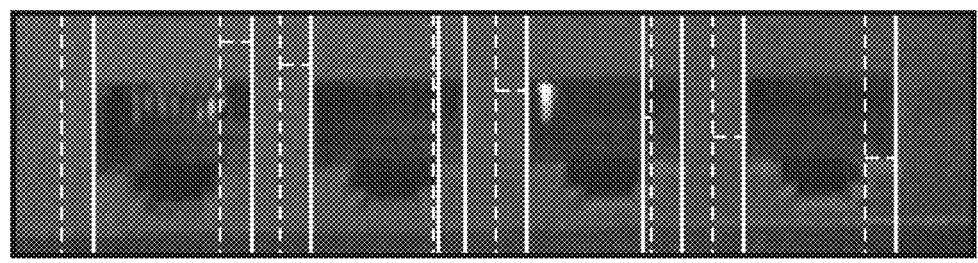
FIG. 12 is an exemplary image showing vertical lines and horizontal line segments overlaid on the image of FIG. 11.

FIG. 12 shows the result after one iteration of scoring function with a starting point chosen being identified by the line with an arrow. Red (dashed) lines are predicted by the algorithm. Green (solid) lines are detected from the image. Horizontal line segments between vertical lines are the errors for this particular starting point and hypothesis. The final score for this iteration of the hypothesis is an average of all the errors.

Figure 13:
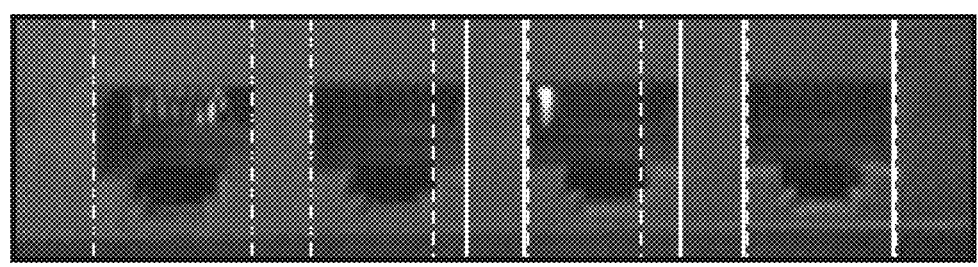
FIG. 13 is an exemplary image showing other vertical lines overlaid on the image of FIG. 11.

FIG. 13 shows the final results of the hypothesis search. Green (dashed) lines are predicted by the algorithm. Red (solid) lines are lines detected from the image that are closest to a predicted line. Blue (dotted) lines are locations where the predicted and detected lines match.

The assumption that the port is darker than the gap between ports might fail in some of the cases. For example, a dark port may be covered by a bright shield (see FIGS. 14-17). This can be overcome by reversing the definition of start of gap which was previously defined as a line associated with a dark to bright transition to a line associated with a bright to dark transition and vice-versa for the end of gap line classification. This is referred to as the bright port assumption. The score can be obtained for both dark port and bright port assumptions. If the score from the dark port assumption is better than the bright port assumption, the results from the dark port assumption are used. If not, the algorithm can take each port found by the bright port assumption and find edges inside the port that correspond to the actual port lines. FIGS. 14-17 illustrate this procedure.

Figure 14:
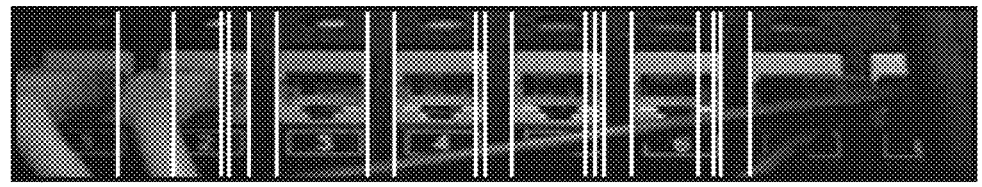
FIG. 14 is an exemplary image showing a combination of vertical lines overlaid on an image of a patch panel with eight ports, four of which are occupied by cables.
Figure 15:
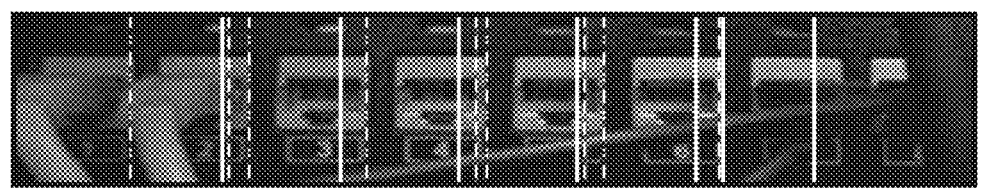
FIG. 15 is an exemplary image showing another combination of vertical lines overlaid on the image of FIG. 14.

FIG. 14 shows the vertical lines detected from the image. FIG. 15 shows a best fit result using the dark port assumption. Green (dashed) lines are predicted by the algorithm. Red (solid) lines are lines detected from the image that are closest to a predicted line. Blue (dotted) lines are locations where the predicted and detected lines match.

Figure 16:
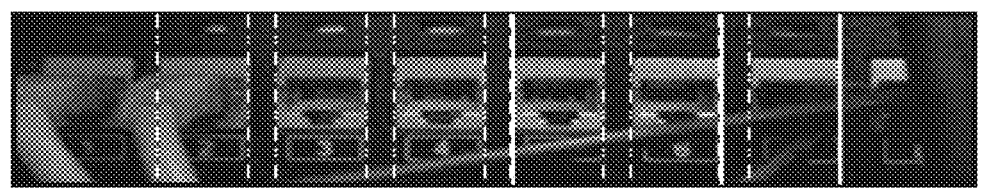
FIG. 16 is an exemplary image showing yet another combination of vertical lines overlaid on the image of FIG. 14.

FIG. 16 shows a best fit result using the bright port assumption, but without adjustment to guessed lines. Green (dashed) lines are predicted by the algorithm. Red (solid) lines are lines detected from the image that are closest to a predicted line. Blue (dotted) lines are locations where the predicted and detected lines match.

Figure 17:
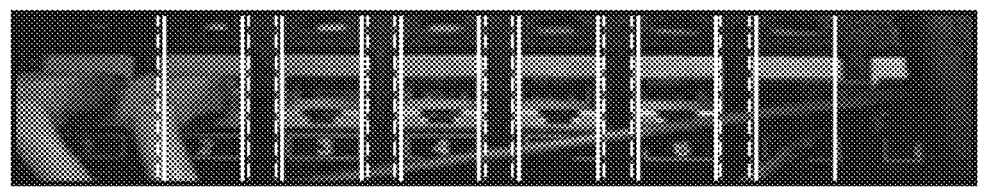
FIG. 17 is an exemplary image showing still another combination of vertical lines overlaid on the image of FIG. 14.

FIG. 17 shows a best fit result using the bright port assumption with adjustment to guessed lines. The guessed lines are adjusted to get more accurate port and gap lines. Green (dashed) lines are predicted by the algorithm. Red (solid) lines are lines detected from the image that are closest to a predicted line. Blue (dotted) lines are locations where the predicted and detected lines match.

The port length and gap length are obtained in terms of number of pixels. A conversion to actual dimensions (e.g., millimeters (mm)) is needed in to provide the label printer with meaningful patch panel dimension information. Here, we assume that the length of port is known (e.g., 12.4 mm) and use this information to calculate the physical gap length.

Experiments were performed on a dataset of 45 patch panel images and a total of 75 region of interests extracted from those images. Each image may contain multiple port groups. The port and gap length in pixels was manually extracted and then physical gap length was calculated to use as ground truth for the experiments. Gap length for 61 out of 75 images was calculated correctly within 0.5 mm margin of error and 68 were classified correctly within 1.0 mm margin of error.

Figure 18:
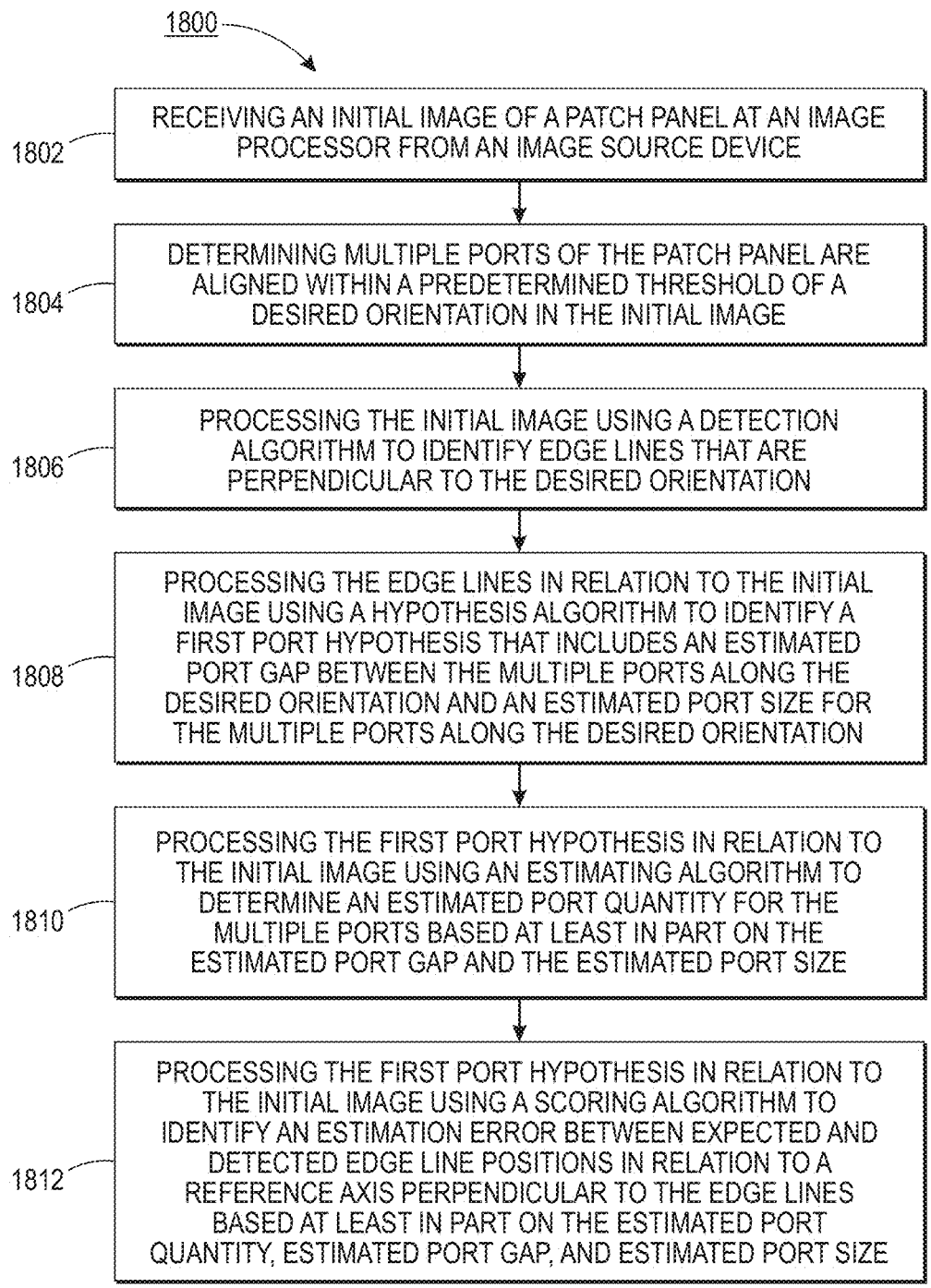
FIG. 18 is a flowchart of an exemplary embodiment of a process for processing an image of a patch panel.

With reference to FIG. 18, an exemplary embodiment of a process 1800 for processing an image of a patch panel begins at 1802 where an initial image of a patch panel is received from an image source device at an image processor. At 1804, the process determines that multiple ports of the patch panel are aligned within a predetermined threshold of a desired orientation in the initial image. Next, the initial image is processed using a detection algorithm to identify edge lines that are perpendicular to the desired orientation (1806). At 1808, the edge lines are processed in relation to the initial image using a hypothesis algorithm to identify a first port hypothesis that includes an estimated port gap between the multiple ports along the desired orientation and an estimated port size for the multiple ports along the desired orientation. The estimated port gap based at least in part on a distance between a first pair of adjacent edge lines. The estimated port size based at least in part on a distance between the first edge line pair and another edge line adjacent to the first edge line pair. At 1810, the first port hypothesis is processed in relation to the initial image using an estimating algorithm to determine an estimated port quantity for the multiple ports based at least in part on the estimated port gap and the estimated port size. Next, the first port hypothesis is processed in relation to the initial image using a scoring algorithm to identify an estimation error between expected and detected edge line positions in relation to a reference axis perpendicular to the edge lines based at least in part on the estimated port quantity, estimated port gap, and estimated port size (1812).

In another embodiment of the process 1800, the detection algorithm includes an edge detection algorithm. In this embodiment, the process 1800 also includes generating a grayscale image of the patch panel based at least in part on the initial image. Next, linear edges are extracted from the grayscale image using the edge detection algorithm to form an edge map associated with the initial image. In yet another embodiment of the process, positions of the edge lines in the initial image are in relation to a reference point on the reference axis that relates to the desired orientation and an image parameter that relates to a distance measure along the reference axis.

Figure 19:
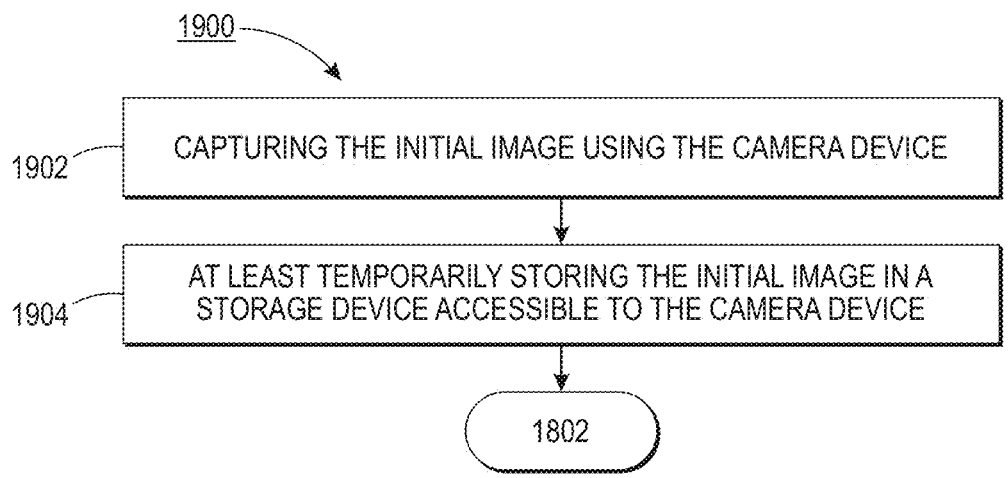
FIG. 19, in conjunction with FIG. 18, is a flowchart of another exemplary embodiment of a process for processing an image of a patch panel.

With reference to FIGS. 18 and 19, in another embodiment of a process 1900 for processing an image of a patch panel, the image source device includes a camera device. In this embodiment, the process 1900 begins at 1902 where the initial image is captured using the camera device. At 1904, the initial image is at least temporarily stored in a storage device accessible to the camera device. The process 1900 includes the process 1800 of FIG. 18 by continuing from 1904 to 1802. In another embodiment, the process 1900 also includes presenting a marker on a view finder or preview screen of the camera device to guide the capturing of the initial image in order to facilitate alignment of the multiple ports of the patch panel in the initial image in conjunction with the capturing. In yet another embodiment of the process 1900, the camera device and image processor are integrated within a wireless device.

Figure 20:
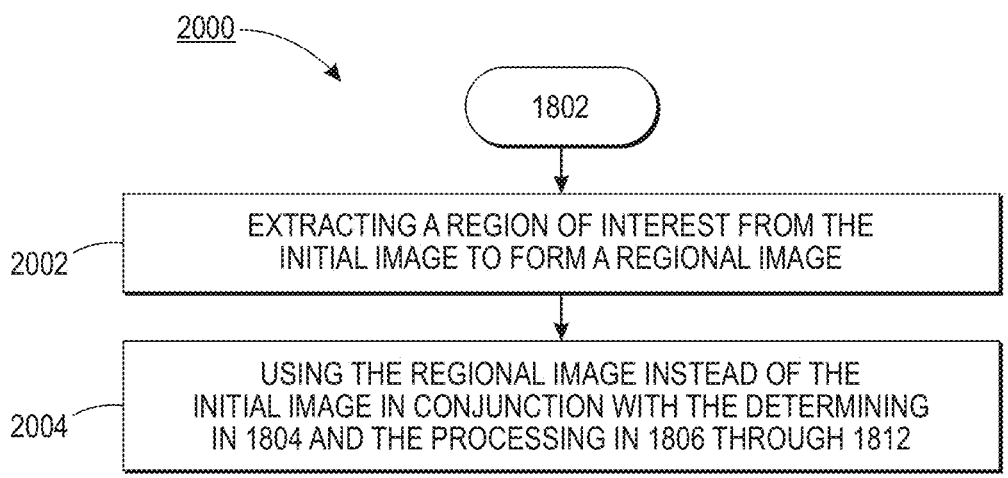
FIG. 20, in conjunction with FIG. 18, is a flowchart of yet another exemplary embodiment of a process for processing an image of a patch panel.

With reference to FIGS. 18 and 20, another embodiment of a process 2000 for processing an image of a patch panel includes the process 1800 of FIG. 18 and continues from 1802 to 2002 where a region of interest is extracted from the initial image to form a regional image. At 2004, the regional image is used instead of the initial image in conjunction with the determining in 1804 and the processing in 1806 through 1812. In yet another embodiment of the process 2000, the region of interest is shaped like a parallelogram in which a first set of parallel sides is four times greater than a second set of parallel sides that are perpendicular to the first set.

Figure 21:
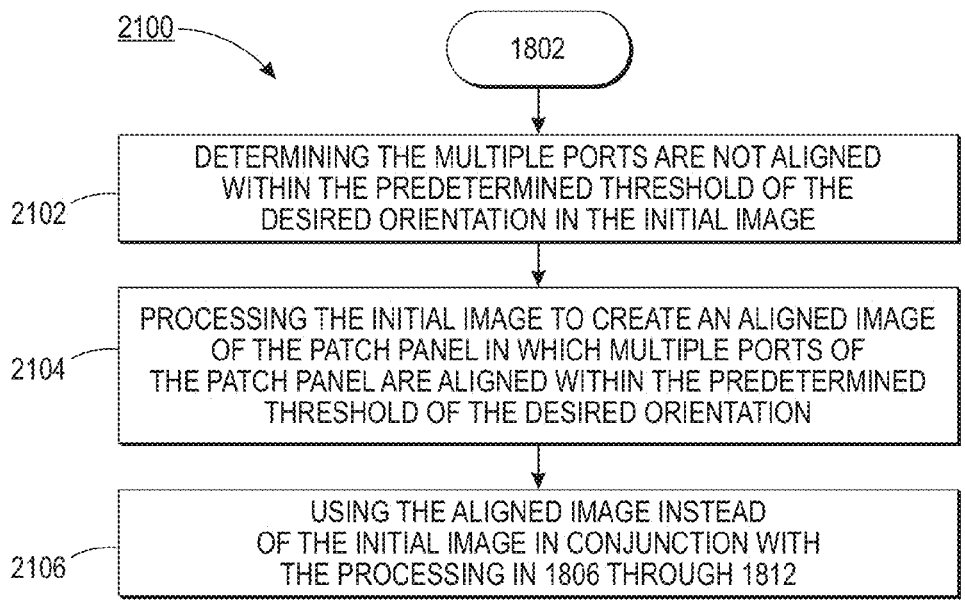
FIG. 21, in conjunction with FIG. 18, is a flowchart of still another exemplary embodiment of a process for processing an image of a patch panel.

With reference to FIGS. 18 and 21, another embodiment of a process 2100 for processing an image of a patch panel includes the process 1800 of FIG. 18 and continues from 1802 to 2102 where the process determines the multiple ports are not aligned within the predetermined threshold of the desired orientation in the initial image. Next, the initial image is processed to create an aligned image of the patch panel in which multiple ports of the patch panel are aligned within the predetermined threshold of the desired orientation (2104). At 2106, the aligned image is used instead of the initial image in conjunction with the processing in 1806 through 1812.

In yet another embodiment of the process 2100, the detection algorithm includes an edge detection algorithm. In this embodiment, the process 2100 also includes generating a grayscale image of the patch panel based at least in part on the initial image. Next, linear edges are extracted from the grayscale image using the edge detection algorithm to form an edge map associated with the initial image. Next, the initial image is adjusted to form the aligned image based at least in part on the linear edges.

Figure 22:
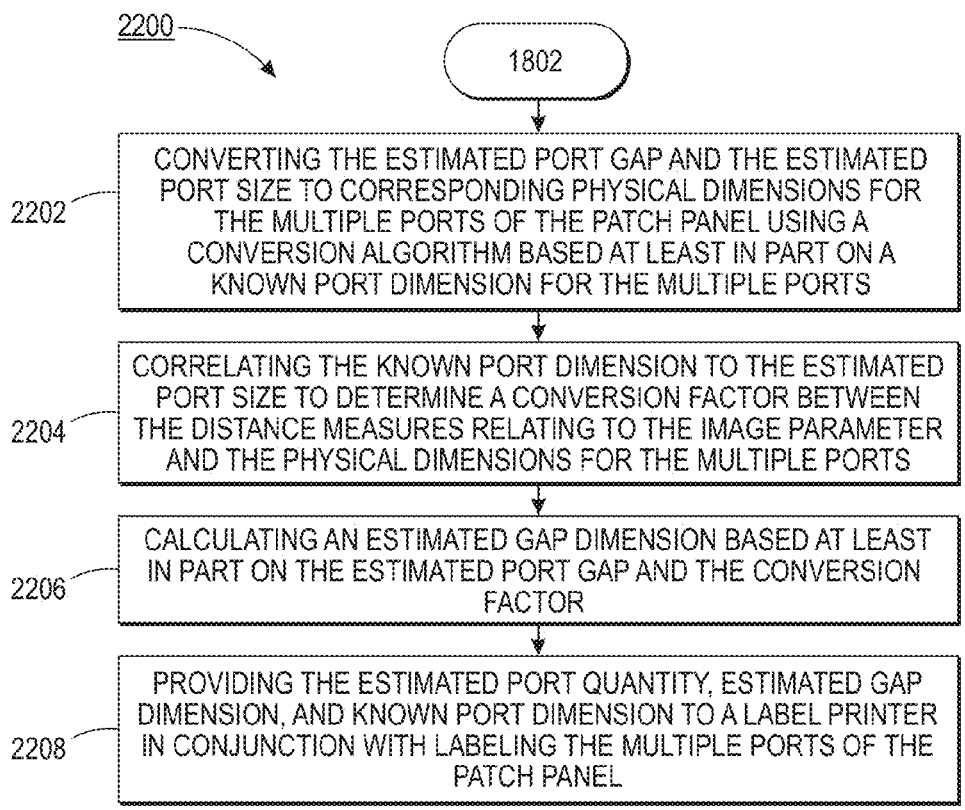
FIG. 22, in conjunction with FIG. 18, is a flowchart of still yet another exemplary embodiment of a process for processing an image of a patch panel.

With reference to FIGS. 18 and 22, in another embodiment of a process 2200 for processing an image of a patch panel, the estimated port gap and the estimated port size are represented using an image parameter for the initial image that relates to a distance measure. In this embodiment, the process 2200 includes the process 1800 of FIG. 18 by continuing from 1812 to 2202 where the estimated port gap and the estimated port size are converted to corresponding physical dimensions for the multiple ports of the patch panel using a conversion algorithm based at least in part on a known port dimension for the multiple ports. At 2204, the known port dimension is correlated to the estimated port size to determine a conversion factor between the distance measures relating to the image parameter and the physical dimensions for the multiple ports. Next, an estimated gap dimension is calculated based at least in part on the estimated port gap and the conversion factor (2206). At 2208, the estimated port quantity, estimated gap dimension, and known port dimension are provided to a label printer in conjunction with labeling the multiple ports of the patch panel.

In yet another embodiment of the process 2200, the multiple ports comprise at least one of RF-45 connectors or sockets, eight position eight contact (8P8C) connectors or sockets, and modular connectors or sockets. In still another embodiment of the process 2200, the known port dimension is 12.4 millimeters. In still yet another embodiment of the process 2200, the image parameter is pixels and distance measures for the image parameter are expressed in pixel quantity.

Figure 23:
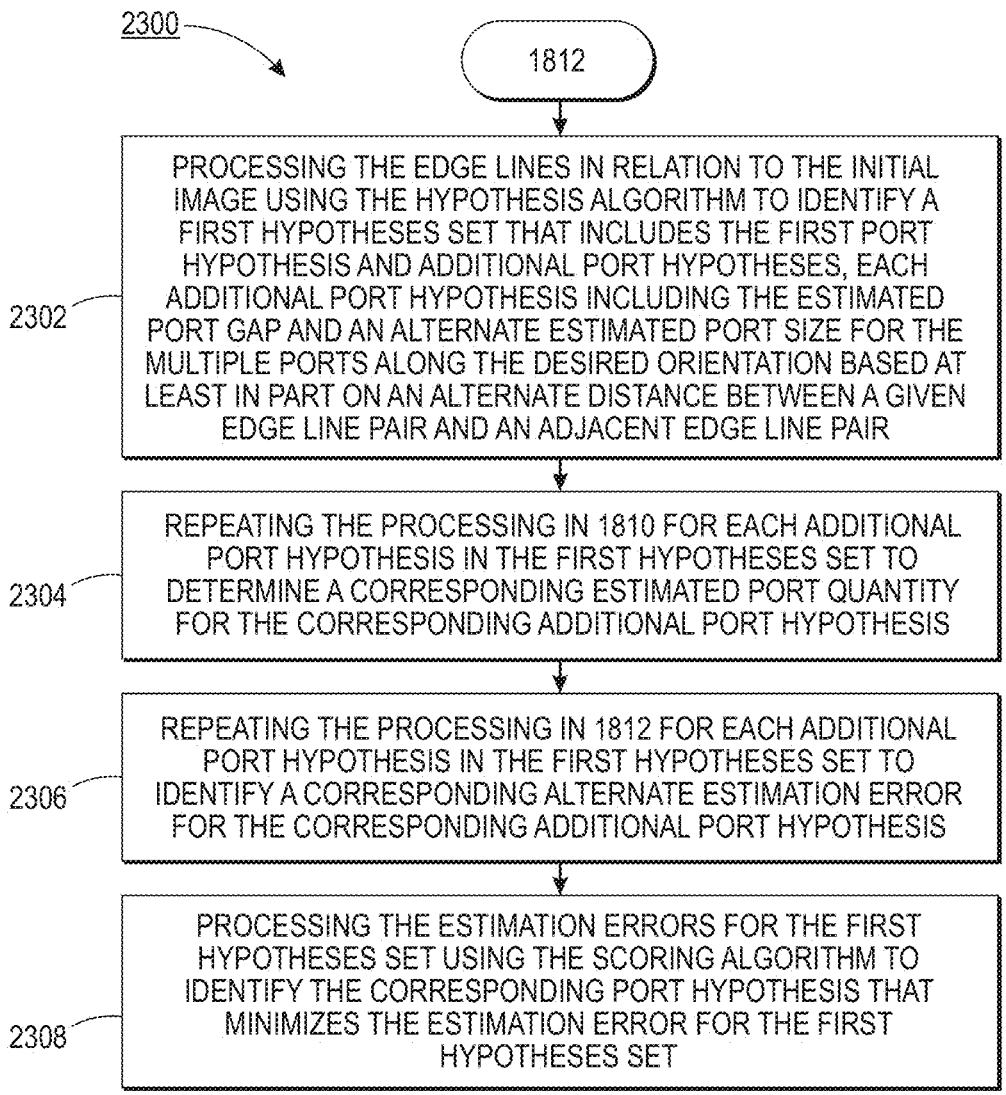
FIG. 23, in conjunction with FIG. 18, is a flowchart of another exemplary embodiment of a process for processing an image of a patch panel.

With reference to FIGS. 18 and 23, another embodiment of a process 2300 for processing an image of a patch panel includes the process 1800 of FIG. 18 and continues from 1812 to 2302 where the edge lines are processed in relation to the initial image using the hypothesis algorithm to identify a first hypotheses set that includes the first port hypothesis and additional port hypotheses. Each additional port hypothesis including the estimated port gap and an alternate estimated port size for the multiple ports along the desired orientation based at least in part on an alternate distance between a given edge line pair and an adjacent edge line pair. The given and adjacent edge line pairs for the corresponding additional port hypothesis have distances between the corresponding edge lines within a predetermined range of the estimated port gap. At 2304, the processing in 1810 is repeated for each additional port hypothesis in the first hypotheses set to determine a corresponding estimated port quantity for the corresponding additional port hypothesis. Next, the processing in 1812 is repeated for each additional port hypothesis in the first hypotheses set to identify a corresponding alternate estimation error for the corresponding additional port hypothesis (2306). At 2308, the estimation errors for the first hypotheses set are processed using the scoring algorithm to identify the corresponding port hypothesis that minimizes the estimation error for the first hypotheses set.

Figure 24:
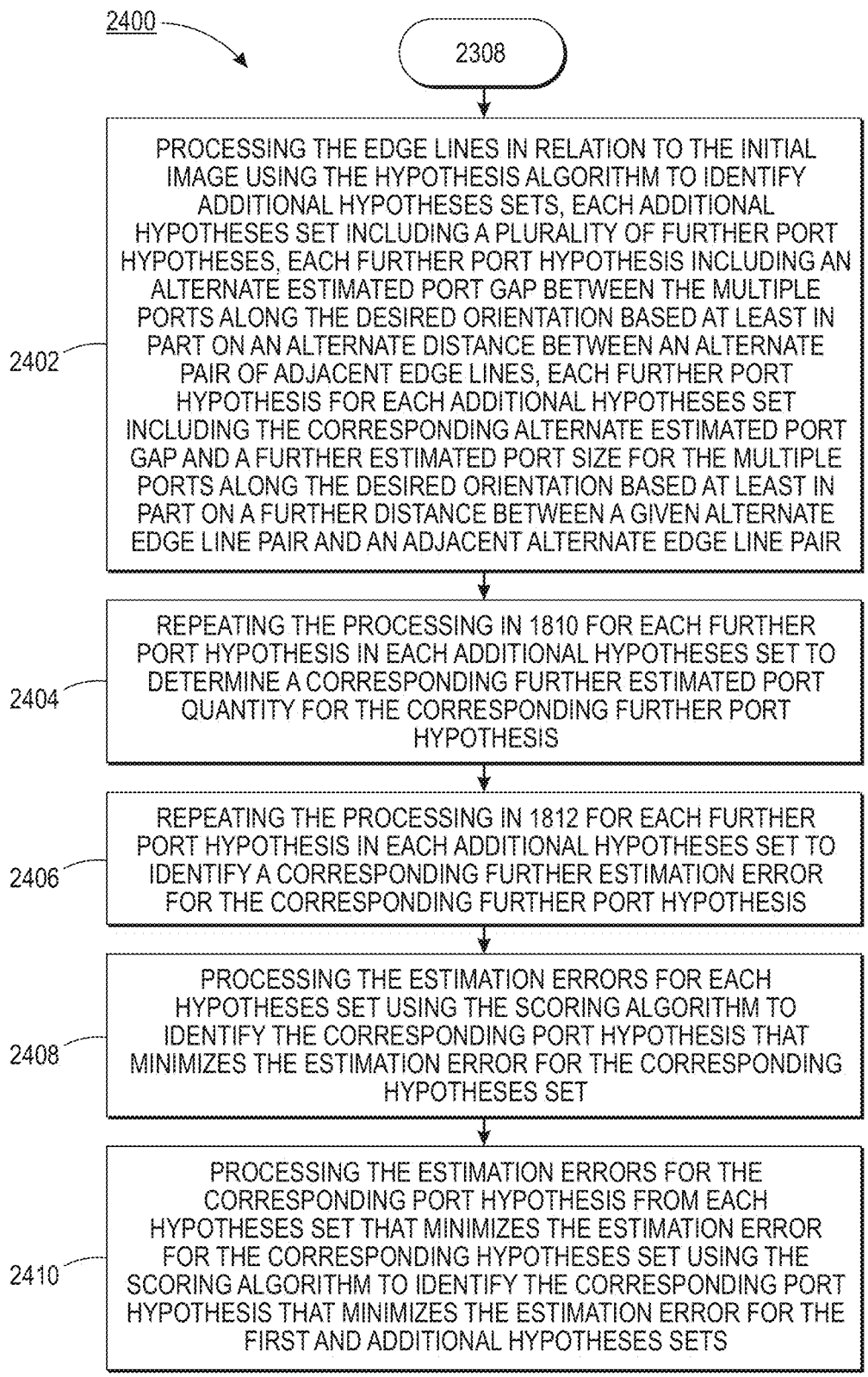
FIG. 24, in conjunction with FIGS. 18 and 23, is a flowchart of yet another exemplary embodiment of a process for processing an image of a patch panel.

With reference to FIGS. 18, 23, and 24, another embodiment of a process 2400 for processing an image of a patch panel includes the processes 1800, 2300 of FIGS. 18 and 23 and continues from 2308 to 2402 where the edge lines are processed in relation to the initial image using the hypothesis algorithm to identify additional hypotheses sets. Each additional hypotheses set including a plurality of further port hypotheses. Each further port hypothesis including an alternate estimated port gap between the multiple ports along the desired orientation based at least in part on an alternate distance between an alternate pair of adjacent edge lines. Each further port hypothesis for each additional hypotheses set including the corresponding alternate estimated port gap and a further estimated port size for the multiple ports along the desired orientation based at least in part on a further distance between a given alternate edge line pair and an adjacent alternate edge line pair. The given and adjacent alternate edge line pairs for the corresponding further port hypothesis have distances between the corresponding edge lines within a predetermined range of the corresponding alternate estimated port gap. At 2404, the processing in 1810 is repeated for each further port hypothesis in each additional hypotheses set to determine a corresponding further estimated port quantity for the corresponding further port hypothesis. Next, the processing in 1812 is repeated for each further port hypothesis in each additional hypotheses set to identify a corresponding further estimation error for the corresponding further port hypothesis (2406). At 2408, the estimation errors for each hypotheses set are processed using the scoring algorithm to identify the corresponding port hypothesis that minimizes the estimation error for the corresponding hypotheses set. Next, the estimation errors for the corresponding port hypothesis from each hypotheses set that minimizes the estimation error for the corresponding hypotheses set are processed using the scoring algorithm to identify the corresponding port hypothesis that minimizes the estimation error for the first and additional hypotheses sets (2410).

Figure 25:
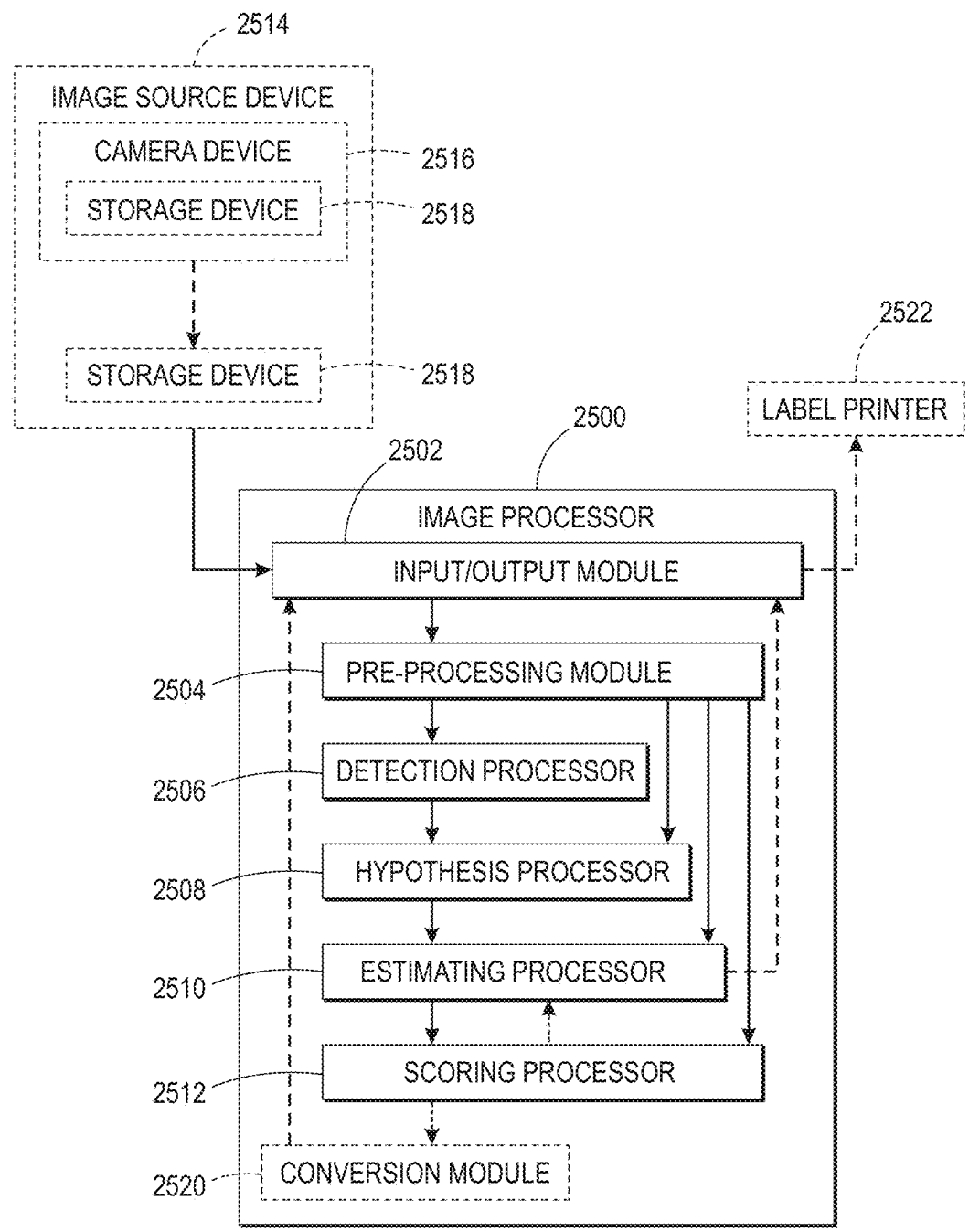
FIG. 25 is a block diagram of an exemplary embodiment of an image processor for processing an image of a patch panel.

With reference to FIG. 25, an exemplary embodiment of an image processor 2500 for processing an image of a patch panel includes an input/output module 2502, a pre-processing module 2504, a detection processor 2506, a hypothesis processor 2508, an estimating processor 2510, and a scoring processor 2512. The input/output module 2502 configured to receive an initial image of a patch panel from an image source device 2514. The pre-processing module 2504 configured to determine multiple ports of the patch panel are aligned within a predetermined threshold of a desired orientation in the initial image. The detection processor 2506 configured to process the initial image using a detection algorithm to identify edge lines that are perpendicular to the desired orientation. The hypothesis processor 2508 configured to process the edge lines in relation to the initial image using a hypothesis algorithm to identify a first port hypothesis that includes an estimated port gap between the multiple ports along the desired orientation and an estimated port size for the multiple ports along the desired orientation. The estimated port gap based at least in part on a distance between a first pair of adjacent edge lines. The estimated port size based at least in part on a distance between the first edge line pair and another edge line adjacent to the first edge line pair. The estimating processor 2510 configured to process the first port hypothesis in relation to the initial image using an estimating algorithm to determine an estimated port quantity for the multiple ports based at least in part on the estimated port gap and the estimated port size. The scoring processor 2512 configured to process the first port hypothesis in relation to the initial image using a scoring algorithm to identify an estimation error between expected and detected edge line positions in relation to a reference axis perpendicular to the edge lines based at least in part on the estimated port quantity, estimated port gap, and estimated port size.

In another embodiment, the image processor 2500 and the image source device 2514 are co-located within an electronic device. In this embodiment, the image source device 2514 includes a camera device 2516 configured to capture the initial image and to at least temporarily store the initial image in a storage device 2518. The camera device 2516 may include the storage device 2518. Alternatively, the storage device 2518 may be separate from the camera device 2516 within the image source device 1514. In a further embodiment, the camera device 2516 is also configured to present a marker on a view finder or preview screen to guide the capturing of the initial image in order to facilitate alignment of the multiple ports of the patch panel in the initial image in conjunction with the capturing. In another further embodiment, the combination of the image processor 2500 and the image source device 2514 with the camera device 2515 may be provided in a wireless device, such as a smartphone, tablet, or any suitable wireless device.

In yet another embodiment of the image processor 2500, the pre-processing module 2504 is also configured to extract a region of interest from the initial image to form a regional image. In this embodiment, the regional image is used by the detection processor 2506, hypothesis processor 2508, estimating processor 2510, and scoring processor 2512 instead of the initial image in conjunction with determining the multiple ports are aligned, identifying the edge lines, processing the edge lines, and processing the first port hypothesis. In a further embodiment, the region of interest is shaped like a parallelogram in which a first set of parallel sides is four times greater than a second set of parallel sides that are perpendicular to the first set.

In still another embodiment of the image processor 2500, the detection algorithm includes an edge detection algorithm. In this embodiment, the detection processor 2506 is also configured to generate a grayscale image of the patch panel based at least in part on the initial image and extract linear edges from the grayscale image using the edge detection algorithm to form an edge map associated with the initial image.

In still yet another embodiment of the image processor 2500, the pre-processing module 2504 is also configured to determine the multiple ports are not aligned within the predetermined threshold of the desired orientation in the initial image. In this embodiment, the pre-processing module 2504 and detection processor 2506 are also configured to cooperate in processing the initial image to create an aligned image of the patch panel in which multiple ports of the patch panel are aligned within the predetermined threshold of the desired orientation. In the embodiment being described, the aligned image is used by the detection processor 2506, hypothesis processor 2508, estimating processor 2510, and scoring processor 2512 instead of the initial image in conjunction with identifying the edge lines, processing the edge lines, and processing the first port hypothesis.

In a further embodiment, the detection algorithm includes an edge detection algorithm. In this embodiment, the detection processor 2506 is also configured to generate a grayscale image of the patch panel based at least in part on the initial image, extract linear edges from the grayscale image using the edge detection algorithm to form an edge map associated with the initial image. In the embodiment being described, the pre-processing module 2504 is also configured to adjust the initial image to form the aligned image based at least in part on the linear edges.

In another embodiment of the image processor 2500, positions of the edge lines in the initial image are in relation to a reference point on the reference axis that relates to the desired orientation and an image parameter that relates to a distance measure along the reference axis.

In yet another embodiment of the image processor 2500, the estimated port gap and the estimated port size are represented using an image parameter for the initial image that relates to a distance measure. In this embodiment, the image processor 2500 also includes a conversion module 2520 configured to convert the estimated port gap and the estimated port size to corresponding physical dimensions for the multiple ports of the patch panel using a conversion algorithm based at least in part on a known port dimension for the multiple ports.

In a further embodiment, the conversion module 2520 is also configured to correlate the known port dimension to the estimated port size to determine a conversion factor between the distance measures relating to the image parameter and the physical dimensions for the multiple ports and calculate an estimated gap dimension based at least in part on the estimated port gap and the conversion factor. In an even further embodiment, the input/output module 2502 is also configured to provide the estimated port quantity, estimated gap dimension, and known port dimension to a label printer 2522 in conjunction with labeling the multiple ports of the patch panel.

In another further embodiment, the multiple ports comprise at least one of RF-45 connectors or sockets, eight position eight contact (8P8C) connectors or sockets, and modular connectors or sockets. In yet another further embodiment, the known port dimension is 12.4 millimeters. In still another further embodiment, the image parameter is pixels and distance measures for the image parameter expressed in pixel quantity.

In still another embodiment of the image processor 2500, the hypothesis processor 2508 is also configured to process the edge lines in relation to the initial image using the hypothesis algorithm to identify a first hypotheses set that includes the first port hypothesis and additional port hypotheses. Each additional port hypothesis including the estimated port gap and an alternate estimated port size for the multiple ports along the desired orientation based at least in part on an alternate distance between a given edge line pair and an adjacent edge line pair. The given and adjacent edge line pairs for the corresponding additional port hypothesis have distances between the corresponding edge lines within a predetermined range of the estimated port gap. In this embodiment, the estimating processor 2510 is also configured to process each additional port hypothesis in the first hypotheses set in relation to the initial image using the estimation algorithm to determine a corresponding alternate estimated port quantity for the corresponding additional port hypothesis. In the embodiment being described, the scoring processor 2512 is also configured to process each additional port hypothesis in the first hypotheses set in relation to the initial image using the scoring algorithm to identify a corresponding alternate estimation error between expected and detected edge line positions based at least in part on the corresponding alternate estimated port quantity, the estimated port gap, and the corresponding alternate estimated port size for the corresponding additional port hypothesis. In this embodiment, the scoring processor 2512 is also configured to process the estimation errors for the first hypotheses set using the scoring algorithm to identify the corresponding port hypothesis that minimizes the estimation error for the first hypotheses set.

In a further embodiment of the image processor 2500, the hypothesis processor 2508 is also configure to process the edge lines in relation to the initial image using the hypothesis algorithm to identify additional hypotheses sets. Each additional hypotheses set including a plurality of further port hypotheses. Each further port hypothesis including an alternate estimated port gap between the multiple ports along the desired orientation based at least in part on an alternate distance between an alternate pair of adjacent edge lines. Each further port hypothesis for each additional hypotheses set including the corresponding alternate estimated port gap and a further estimated port size for the multiple ports along the desired orientation based at least in part on a further distance between a given alternate edge line pair and an adjacent alternate edge line pair. The given and adjacent alternate edge line pairs for the corresponding further port hypothesis have distances between the corresponding edge lines within a predetermined range of the corresponding alternate estimated port gap. In this embodiment, the estimating processor 2510 is also configured to process each further port hypothesis in each additional hypotheses set in relation to the initial image using the estimation algorithm to determine a corresponding further estimated port quantity for the corresponding further port hypothesis. In the embodiment being described, the scoring processor 2512 is also configured to process each further port hypothesis in each additional hypotheses set in relation to the initial image using the scoring algorithm to identify a corresponding further estimation error between expected and detected edge line positions based at least in part on the corresponding further estimated port quantity, the corresponding alternate estimated port gap, and the corresponding further estimated port size for the corresponding further port hypothesis. In this embodiment, the scoring processor 2512 is also configured to process the estimation errors for each hypotheses set using the scoring algorithm to identify the corresponding port hypothesis that minimizes the estimation error for the corresponding hypotheses set. In the embodiment being described, the scoring processor 2512 is also configured to process the estimation errors for the corresponding port hypothesis from each hypotheses set that minimizes the estimation error for the corresponding hypotheses set using the scoring algorithm to identify the corresponding port hypothesis that minimizes the estimation error for the first and additional hypotheses sets.

Figure 26:
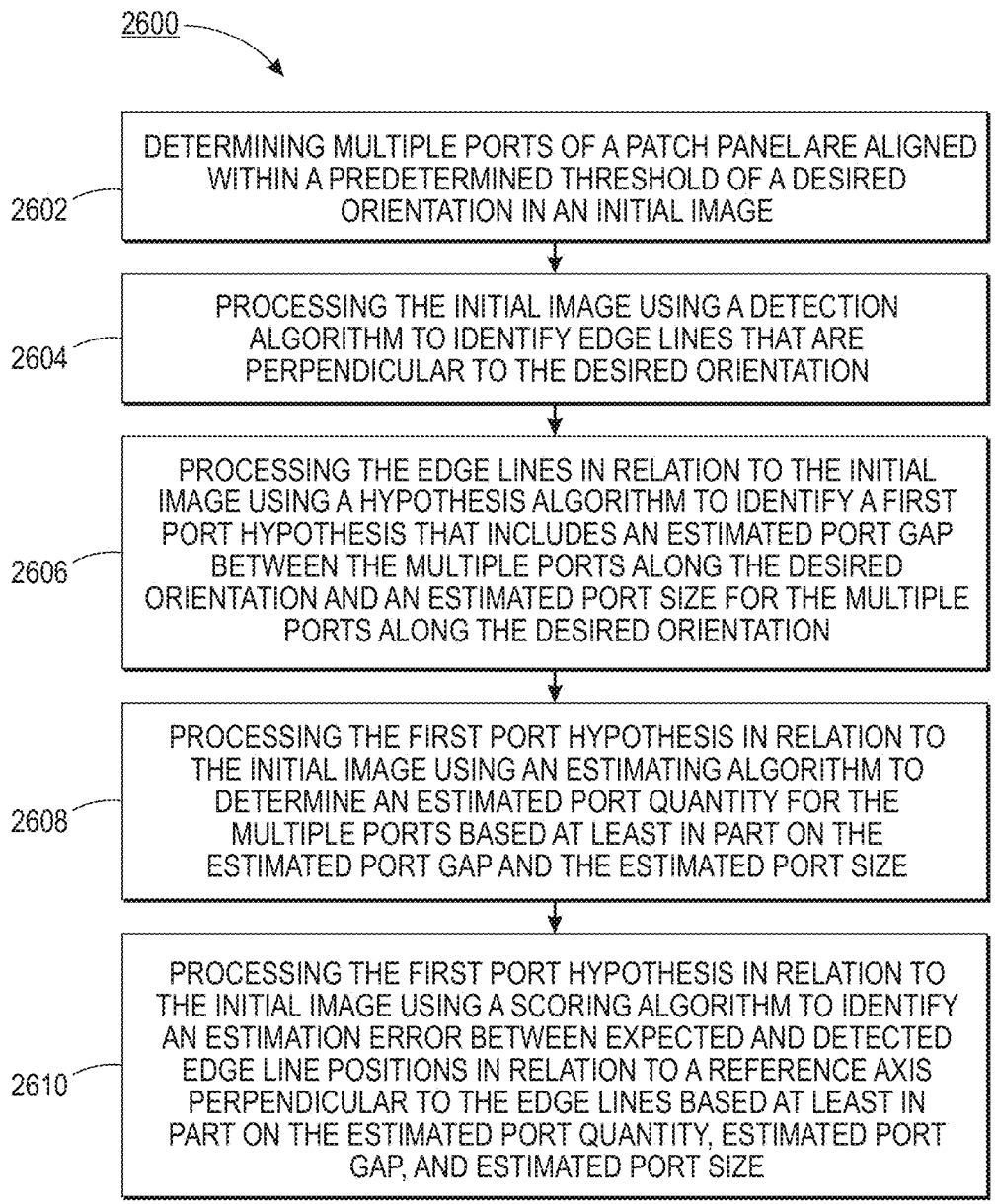
FIG. 26 is a flowchart of an exemplary embodiment of a process for processing an image of a patch panel performed by a computer-controlled device in response to a computer executing program instructions stored on a non-transitory computer-readable medium.

With reference again to FIG. 26, an exemplary embodiment of a non-transitory computer-readable medium storing program instructions that, when executed by a computer, cause a corresponding computer-controlled device in a P2P network to perform a process 2600 for processing an image of a patch panel that begins at 2602 where the process determines multiple ports of a patch panel are aligned within a predetermined threshold of a desired orientation in an initial image. At 2604, the initial image is processed using a detection algorithm to identify edge lines that are perpendicular to the desired orientation. Next, the edge lines are processed in relation to the initial image using a hypothesis algorithm to identify a first port hypothesis that includes an estimated port gap between the multiple ports along the desired orientation and an estimated port size for the multiple ports along the desired orientation (2606). The estimated port gap based at least in part on a distance between a first pair of adjacent edge lines. The estimated port size based at least in part on a distance between the first edge line pair and another edge line adjacent to the first edge line pair. At 2608, the first port hypothesis is processed in relation to the initial image using an estimating algorithm to determine an estimated port quantity for the multiple ports based at least in part on the estimated port gap and the estimated port size. Next, the first port hypothesis in relation to the initial image using a scoring algorithm to identify an estimation error between expected and detected edge line positions in relation to a reference axis perpendicular to the edge lines based at least in part on the estimated port quantity, estimated port gap, and estimated port size (2610).

In another embodiment of the non-transitory computer readable medium, the process 2600 also includes capturing the initial image using the camera device. Next, the initial image is at least temporarily stored in a storage device accessible to the camera device. In a further embodiment, the process also includes presenting a marker on a view finder or preview screen of the camera device to guide the capturing of the initial image in order to facilitate alignment of the multiple ports of the patch panel in the initial image in conjunction with the capturing.

In yet another embodiment of the non-transitory computer readable medium, the process 2600 also includes extracting a region of interest from the initial image to form a regional image. In this embodiment, the regional image is used instead of the initial image in conjunction with the determining in 2602 and the processing in 2604 through 2610.

In still another embodiment of the non-transitory computer readable medium, the process 2600 also includes determining the desired orientation in the initial image is not aligned within the predetermined threshold. Next, the initial image is processed to create an aligned image of the patch panel in which multiple ports of the patch panel are aligned within the predetermined threshold of the desired orientation. In this embodiment, the aligned image is used instead of the initial image in conjunction with the processing in 2604 through 2610.

In still yet another embodiment of the non-transitory computer readable medium, the estimated port gap and the estimated port size are represented using an image parameter for the initial image that relates to a distance measure. In this embodiment, the process 2600 also includes converting the estimated port gap and the estimated port size to corresponding physical dimensions for the multiple ports of the patch panel using a conversion algorithm based at least in part on a known port dimension for the multiple ports.

In a further embodiment, the process 2600 also includes correlating the known port dimension to the estimated port size to determine a conversion factor between the distance measures relating to the image parameter and the physical dimensions for the multiple ports. Next, an estimated gap dimension is calculated based at least in part on the estimated port gap and the conversion factor. In an even further embodiment, the process 2600 also includes providing the estimated port quantity, estimated gap dimension, and known port dimension to a label printer in conjunction with labeling the multiple ports of the patch panel.

In another further embodiment, the process also includes processing the edge lines in relation to the initial image using the hypothesis algorithm to identify a first hypotheses set that includes the first port hypothesis and additional port hypotheses. Each additional port hypothesis including the estimated port gap and an alternate estimated port size for the multiple ports along the desired orientation based at least in part on an alternate distance between a given edge line pair and an adjacent edge line pair. The given and adjacent edge line pairs for the corresponding additional port hypothesis have distances between the corresponding edge lines within a predetermined range of the estimated port gap. Next, the processing in 2608 is repeated for each additional port hypothesis in the first hypotheses set to determine a corresponding estimated port quantity for the corresponding additional port hypothesis. Then, the processing in 2610 is repeated for each additional port hypothesis in the first hypotheses set to identify a corresponding alternate estimation error for the corresponding additional port hypothesis. Next, the estimation errors for the first hypotheses set are processed using the scoring algorithm to identify the corresponding port hypothesis that minimizes the estimation error for the first hypotheses set.

In an even further embodiment, the process 2600 also includes processing the edge lines in relation to the initial image using the hypothesis algorithm to identify additional hypotheses sets. Each additional hypotheses set including a plurality of further port hypotheses. Each further port hypothesis including an alternate estimated port gap between the multiple ports along the desired orientation based at least in part on an alternate distance between an alternate pair of adjacent edge lines. Each further port hypothesis for each additional hypotheses set including the corresponding alternate estimated port gap and a further estimated port size for the multiple ports along the desired orientation based at least in part on a further distance between a given alternate edge line pair and an adjacent alternate edge line pair. The given and adjacent alternate edge line pairs for the corresponding further port hypothesis have distances between the corresponding edge lines within a predetermined range of the corresponding alternate estimated port gap. Next, the processing in 2608 is repeated for each further port hypothesis in each additional hypotheses set to determine a corresponding further estimated port quantity for the corresponding further port hypothesis. Then, the processing in 2610 is repeated for each further port hypothesis in each additional hypotheses set to identify a corresponding further estimation error for the corresponding further port hypothesis. Next, the estimation errors for each hypotheses set are processed using the scoring algorithm to identify the corresponding port hypothesis that minimizes the estimation error for the corresponding hypotheses set. Then, the estimation errors for the corresponding port hypothesis from each hypotheses set that minimizes the estimation error for the corresponding hypotheses set are processed using the scoring algorithm to identify the corresponding port hypothesis that minimizes the estimation error for the first and additional hypotheses sets.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for processing an image of a patch panel, comprising:
    a) receiving an initial image of a patch panel from an image source device at an image processor;
    b) determining multiple ports of the patch panel are aligned within a predetermined threshold of a desired orientation in the initial image;
    c) processing the initial image using a detection algorithm to identify edge lines that are perpendicular to the desired orientation;
    d) processing the edge lines in relation to the initial image using a hypothesis algorithm to identify a first port hypothesis that includes an estimated port gap between the multiple ports along the desired orientation and an estimated port size for the multiple ports along the desired orientation, the estimated port gap based at least in part on a distance between a first pair of adjacent edge lines, the estimated port size based at least in part on a distance between the first edge line pair and another edge line adjacent to the first edge line pair;
    e) processing the first port hypothesis in relation to the initial image using an estimating algorithm to determine an estimated port quantity for the multiple ports based at least in part on the estimated port gap and the estimated port size; and
    f) processing the first port hypothesis in relation to the initial image using a scoring algorithm to identify an estimation error between expected and detected edge line positions in relation to a reference axis perpendicular to the edge lines based at least in part on the estimated port quantity, estimated port gap, and estimated port size.

2. The method of claim 1 wherein the image source device includes a camera device, the method further comprising:
    capturing the initial image using the camera device; and
    at least temporarily storing the initial image in a storage device accessible to the camera device.

3. The method of claim 2, further comprising:
    presenting a marker on a view finder or preview screen of the camera device to guide the capturing of the initial image in order to facilitate alignment of the multiple ports of the patch panel in the initial image in conjunction with the capturing.

4. The method of claim 1, further comprising:
    extracting a region of interest from the initial image to form a regional image;
    wherein the regional image is used instead of the initial image in conjunction with the determining in b) and the processing in c) through f).

5. The method of claim 1 wherein the detection algorithm includes an edge detection algorithm, the method further comprising:
    generating a grayscale image of the patch panel based at least in part on the initial image; and
    extracting linear edges from the grayscale image using the edge detection algorithm to form an edge map associated with the initial image.

6. The method of claim 1, further comprising:
    determining the multiple ports are not aligned within the predetermined threshold of the desired orientation in the initial image; and
    processing the initial image to create an aligned image of the patch panel in which multiple ports of the patch panel are aligned within the predetermined threshold of the desired orientation;
    wherein the aligned image is used instead of the initial image in conjunction with the processing in c) through f).

7. The method of claim 6 wherein the detection algorithm includes an edge detection algorithm, the method further comprising:
    generating a grayscale image of the patch panel based at least in part on the initial image;
    extracting linear edges from the grayscale image using the edge detection algorithm to form an edge map associated with the initial image; and
    adjusting the initial image to form the aligned image based at least in part on the linear edges.

8. The method of claim 1 wherein the estimated port gap and the estimated port size are represented using an image parameter for the initial image that relates to a distance measure, the method further comprising:

converting the estimated port gap and the estimated port size to corresponding physical dimensions for the multiple ports of the patch panel using a conversion algorithm based at least in part on a known port dimension for the multiple ports.

9. The method of claim 8, further comprising:

correlating the known port dimension to the estimated port size to determine a conversion factor between the distance measures relating to the image parameter and the physical dimensions for the multiple ports; and calculating an estimated gap dimension based at least in part on the estimated port gap and the conversion factor.

10. The method of claim 9, further comprising:

providing the estimated port quantity, estimated gap dimension, and known port dimension to a label printer in conjunction with labeling the multiple ports of the patch panel.

11. The method of claim 1, further comprising:

processing the edge lines in relation to the initial image using the hypothesis algorithm to identify a first hypotheses set that includes the first port hypothesis and additional port hypotheses, each additional port hypothesis including the estimated port gap and an alternate estimated port size for the multiple ports along the desired orientation based at least in part on an alternate distance between a given edge line pair and an adjacent edge line pair, wherein the given and adjacent edge line pairs for the corresponding additional port hypothesis have distances between the corresponding edge lines within a predetermined range of the estimated port gap;

repeating the processing in e) for each additional port hypothesis in the first hypotheses set to determine a corresponding estimated port quantity for the corresponding additional port hypothesis;

repeating the processing in f) for each additional port hypothesis in the first hypotheses set to identify a corresponding alternate estimation error for the corresponding additional port hypothesis; and processing the estimation errors for the first hypotheses set using the scoring algorithm to identify the corresponding port hypothesis that minimizes the estimation error for the first hypotheses set.

12. The method of claim 11, further comprising:

processing the edge lines in relation to the initial image using the hypothesis algorithm to identify additional hypotheses sets, each additional hypotheses set including a plurality of further port hypotheses, each further port hypothesis including an alternate estimated port gap between the multiple ports along the desired orientation based at least in part on an alternate distance between an alternate pair of adjacent edge lines, each further port hypothesis for each additional hypotheses set including the corresponding alternate estimated port gap and a further estimated port size for the multiple ports along the desired orientation based at least in part on a further distance between a given alternate edge line pair and an adjacent alternate edge line pair, wherein the given and adjacent alternate edge line pairs for the corresponding further port hypothesis have distances between the corresponding edge lines within a predetermined range of the corresponding alternate estimated port gap;

repeating the processing in e) for each further port hypothesis in each additional hypotheses set to determine a corresponding further estimated port quantity for the corresponding further port hypothesis;

repeating the processing in f) for each further port hypothesis in each additional hypotheses set to identify a corresponding further estimation error for the corresponding further port hypothesis;

processing the estimation errors for each hypotheses set using the scoring algorithm to identify the corresponding port hypothesis that minimizes the estimation error for the corresponding hypotheses set; and processing the estimation errors for the corresponding port hypothesis from each hypotheses set that minimizes the estimation error for the corresponding hypotheses set using the scoring algorithm to identify the corresponding port hypothesis that minimizes the estimation error for the first and additional hypotheses sets.

13. An apparatus for processing an image of a patch panel, comprising:

an input/output module configured to receive an initial image of a patch panel from an image source device;

a pre-processing module configured to determine multiple ports of the patch panel are aligned within a predetermined threshold of a desired orientation in the initial image;

a detection processor configured to process the initial image using a detection algorithm to identify edge lines that are perpendicular to the desired orientation;

a hypothesis processor configured to process the edge lines in relation to the initial image using a hypothesis algorithm to identify a first port hypothesis that includes an estimated port gap between the multiple ports along the desired orientation and an estimated port size for the multiple ports along the desired orientation, the estimated port gap based at least in part on a distance between a first pair of adjacent edge lines, the estimated port size based at least in part on a distance between the first edge line pair and another edge line adjacent to the first edge line pair;

an estimating processor configured to process the first port hypothesis in relation to the initial image using an estimating algorithm to determine an estimated port quantity for the multiple ports based at least in part on the estimated port gap and the estimated port size; and a scoring processor configured to process the first port hypothesis in relation to the initial image using a scoring algorithm to identify an estimation error between expected and detected edge line positions in relation to a reference axis perpendicular to the edge lines based at least in part on the estimated port quantity, estimated port gap, and estimated port size.

14. The apparatus of claim 13 wherein the apparatus comprises the image source device, the image source device comprising:

a camera device configured to capture the initial image and to at least temporarily store the initial image in a storage device.

15. The apparatus of claim 14 wherein the apparatus comprises a wireless device.

16. The apparatus of claim 13 wherein the estimated port gap and the estimated port size are represented using an image parameter for the initial image that relates to a distance measure, the apparatus further comprising:

a conversion module configured to convert the estimated port gap and the estimated port size to corresponding physical dimensions for the multiple ports of the patch panel using a conversion algorithm based at least in part on a known port dimension for the multiple ports.

17. The apparatus of claim 16 wherein the conversion module is also configured to correlate the known port dimension to the estimated port size to determine a conversion factor between the distance measures relating to the image parameter and the physical dimensions for the multiple ports and calculate an estimated gap dimension based at least in part on the estimated port gap and the conversion factor;

wherein the input/output module is also configured to provide the estimated port quantity, estimated gap dimension, and known port dimension to a label printer in conjunction with labeling the multiple ports of the patch panel.

18. A non-transitory computer-readable medium storing program instructions that, when executed by a computer, cause a corresponding computer-controlled device to perform a method for processing an image of a patch panel, the method comprising:

a) determining multiple ports of the patch panel are aligned within a predetermined threshold of a desired orientation in the initial image;

b) processing the initial image using a detection algorithm to identify edge lines that are perpendicular to the desired orientation;

c) processing the edge lines in relation to the initial image using a hypothesis algorithm to identify a first port hypothesis that includes an estimated port gap between the multiple ports along the desired orientation and an estimated port size for the multiple ports along the desired orientation, the estimated port gap based at least in part on a distance between a first pair of adjacent edge lines, the estimated port size based at least in part on a distance between the first edge line pair and another edge line adjacent to the first edge line pair;

d) processing the first port hypothesis in relation to the initial image using an estimating algorithm to determine an estimated port quantity for the multiple ports based at least in part on the estimated port gap and the estimated port size; and e) processing the first port hypothesis in relation to the initial image using a scoring algorithm to identify an estimation error between expected and detected edge line positions in relation to a reference axis perpendicular to the edge lines based at least in part on the estimated port quantity, estimated port gap, and estimated port size.

19. The non-transitory computer readable medium of claim 18, the method further comprising:

processing the edge lines in relation to the initial image using the hypothesis algorithm to identify a first hypotheses set that includes the first port hypothesis and additional port hypotheses, each additional port hypothesis including the estimated port gap and an alternate estimated port size for the multiple ports along the desired orientation based at least in part on an alternate distance between a given edge line pair and an adjacent edge line pair, wherein the given and adjacent edge line pairs for the corresponding additional port hypothesis have distances between the corresponding edge lines within a predetermined range of the estimated port gap;

repeating the processing in d) for each additional port hypothesis in the first hypotheses set to determine a corresponding estimated port quantity for the corresponding additional port hypothesis;

repeating the processing in e) for each additional port hypothesis in the first hypotheses set to identify a corresponding alternate estimation error for the corresponding additional port hypothesis; and processing the estimation errors for the first hypotheses set using the scoring algorithm to identify the corresponding port hypothesis that minimizes the estimation error for the first hypotheses set.

20. The non-transitory computer readable medium of claim 19, the method further comprising:

processing the edge lines in relation to the initial image using the hypothesis algorithm to identify additional hypotheses sets, each additional hypotheses set including a plurality of further port hypotheses, each further port hypothesis including an alternate estimated port gap between the multiple ports along the desired orientation based at least in part on an alternate distance between an alternate pair of adjacent edge lines, each further port hypothesis for each additional hypotheses set including the corresponding alternate estimated port gap and a further estimated port size for the multiple ports along the desired orientation based at least in part on a further distance between a given alternate edge line pair and an adjacent alternate edge line pair, wherein the given and adjacent alternate edge line pairs for the corresponding further port hypothesis have distances between the corresponding edge lines within a predetermined range of the corresponding alternate estimated port gap;

repeating the processing in d) for each further port hypothesis in each additional hypotheses set to determine a corresponding further estimated port quantity for the corresponding further port hypothesis;

repeating the processing in e) for each further port hypothesis in each additional hypotheses set to identify a corresponding further estimation error for the corresponding further port hypothesis;

processing the estimation errors for each hypotheses set using the scoring algorithm to identify the corresponding port hypothesis that minimizes the estimation error for the corresponding hypotheses set; and processing the estimation errors for the corresponding port hypothesis from each hypotheses set that minimizes the estimation error for the corresponding hypotheses set using the scoring algorithm to identify the corresponding port hypothesis that minimizes the estimation error for the first and additional hypotheses sets.

* * * * *